United States Patent [19]
Göckler

[11] Patent Number: 5,185,642
[45] Date of Patent: Feb. 9, 1993

[54] IMPROVED METHOD AND ARRANGEMENT FOR PROCESSING OUTPUT SIGNALS OF A FIBER RING INTERFEROMETER

[75] Inventor: Heinz Göckler, Backnang, Fed. Rep. of Germany

[73] Assignee: ANT Nachrichtentechnik GmbH, Backnang, Fed. Rep. of Germany

[21] Appl. No.: 631,102

[22] Filed: Dec. 19, 1990

[30] Foreign Application Priority Data

Dec. 20, 1989 [DE] Fed. Rep. of Germany ....... 3941991

[51] Int. Cl.$^5$ ............................................. G01C 19/72
[52] U.S. Cl. ................................................ 356/350
[58] Field of Search ............................ 356/350, 345; 250/227.19, 227.27

[56] References Cited

U.S. PATENT DOCUMENTS

| | | | |
|---|---|---|---|
| 4,280,766 | 7/1981 | Goss et al. | 356/350 |
| 4,456,376 | 6/1984 | Carrington et al. | 356/350 |
| 4,549,806 | 10/1985 | Marten et al. | 356/350 |

FOREIGN PATENT DOCUMENTS 2645264 10/1990 France .

OTHER PUBLICATIONS

"Fiber Optic Laser Gyro Signal Detection and Processing Technique", Martin et al, Mar. 1978, Spie, pp. 98-102.

Primary Examiner—Samuel A. Turner
Attorney, Agent, or Firm—Spencer, Frank & Schneider

[57] ABSTRACT

A method and circuit arrangement for determining angular velocities by means of an optical fiber ring interferometer includes, in addition to, a phase modulator for modulating light waves passing through an optical fiber ring of the interferometer at a phase modulation frequency f, and a device for combining light waves leaving the optical fiber ring to produce an output signal, a unit for generating a sampling frequency $f_A$ according to the following equations:

$$f_A = (f \pm f_\Delta)/m$$

$$f_A = \frac{l}{m} f_\Delta$$

wherein the factors m and l are integers and $f_\Delta$ is a whole number component i.e., subharmonic, of the phase modulation frequency. The output signal of the interferometer is sampled at the frequency $f_A$ during conversion via an analog/digital converter into a digital signal. The digitilized signal is evaluated to determine the angular velocity.

15 Claims, 2 Drawing Sheets

IMPROVED METHOD AND ARRANGEMENT FOR PROCESSING OUTPUT SIGNALS OF A FIBER RING INTERFEROMETER

CROSS-REFERENCE TO RELATED APPLICATION

The present disclosure relates to the subject matter disclosed in Country Application No. P 39 41 991.6 of the Federal Republic of Germany filed Dec. 20, 1989, the entire specification of which is incorporated herein by reference.

BACKGROUND OF THE INVENTION

The present invention relates to a method and an arrangement for determining angular velocities with the aid of an optical fiber ring interferometer, wherein light waves passing through an optical fiber of the ring interferometer are phase modulated and the output signal of the ring interferometer is evaluated after an analog/-digital conversion in order to determine the angular velocity.

Such a method and an arrangement for implementing the method are disclosed in U.S. Pat. No. 4,549,806 which issued on Oct. 29, 1985, the subject matter of which being incorporated herein by reference. The optical fiber of this ring interferometer serves to propagate two light waves which move in opposite directions and which interfere with one another when they exit from the optical fiber. The interference depends on the angular velocity with which the optical fiber in the form of at least one turn is rotated. The angular velocity is proportional to the phase difference between the two light waves that have passed through the optical fiber in opposite directions. This phase difference, the so-called Sagnac phase shift, can be determined from the amplitudes of the spectral lines of the interference light exiting from the optical fiber.

In order to obtain an optical fiber ring interferometer output signal which is suitable for a determination of the Sagnac phase, light waves exiting from one end of the optical fiber disclosed in U.S. Pat. No. 4,549,806 are phase modulated and combined to produce an analog output signal. The evaluation of the analog output signal, in order to determine the Sagnac phase, is advantageously effected by means of a digital signal processing circuit. Since the analog output signal has an unfavorably high frequency position for the subsequent analog/digital conversion, due to the required high phase modulation frequency, U.S. Pat. No. 4,546,806 provides means for either pulsing the power of light fed into the optical fiber ring interferometer at a suitable frequency or reducing the output signal by means of a mixer to a lower frequency position before the analog/digital conversion. However, these solutions entail additional circuitry expenditures. Another drawback of employing a mixer to reduce the output signal frequency is that undesirable mixing products result which must be suppressed by additional analog filtering in order to meet the sampling theorem and thus, negate any undue spectral convolution products which would greatly falsify the signal to be evaluated.

SUMMARY OF THE INVENTION

It is an object of the present invention to provide a method and an arrangement of the above-mentioned type with which a digital evaluation of the output signal from the optical fiber ring interferometer can be made without additional expenditures for circuitry. Accordingly, an aspect of the invention is to provide a digital evaluation method and arrangement which are simple and less expensive than prior art systems.

This is accomplished, according to the present invention, by providing a method for determining angular velocities by means of an optical fiber ring interferometer which includes passing light waves, in opposite directions, through the optical fiber ring interferometer; modulating the passing light waves with a phase modulation frequency f; and combining the light waves leaving the ring interferometer to form an output signal with the steps of generating a sampling frequency $f_A$ according to the following equations:

$$f_A = (f \pm f_\Delta)/m$$

$$f_A = \frac{l}{m} f_\Delta$$

wherein the factors m and l are integers, and $f_\Delta$ is a whole number component i.e., subharmonic, of the phase modulation frequency; converting the output signal via an analog/digital converter into a digital signal at the sampling frequency $f_A$; and evaluating the resultant digital signal to determine the angular velocity.

According to the present invention, the frequency of the optical fiber ring interferometer output signal is converted into a frequency position favorable for digital signal processing without additional circuit means and without producing interfering frequency mixing products which would have to be suppressed by means of complicated filter arrangements.

A further aspect of the invention is provided with the following improvement in a circuit arrangement for determining angular velocities by means of an optical ring interferometer including a light source emitting a light beam; means for dividing the emitted light beam into two beams and passing the two beams of light waves, in opposite directions, through an optical ring fiber of the interferometer; phase modulation means for modulating light waves passing at a phase modulation frequency f; and means for combining the light waves leaving the optical ring to produce an output signal. The improvement, according to the present invention, includes analog/digital conversion means for converting the output signal of the interferometer into a digital signal using a sampling frequency $f_A$ generated so that the following conditions are met:

$$f_A = (f \pm f_\Delta)/m$$

$$f_A = \frac{l}{m} f_\Delta$$

where the factors m and l are integers and $f_\Delta$ is a whole number component i.e., subharmonic, of the phase modulation frequency f; and means for evaluating the resultant digitilized signal to determine the angular velocity.

BRIEF DESCRIPTION OF THE DRAWINGS

The present invention will now be described in greater detail with reference to the accompanying drawing figures in which.

DETAILED DESCRIPTION OF THE PREFERRED EMBODIMENTS

Figure 1:
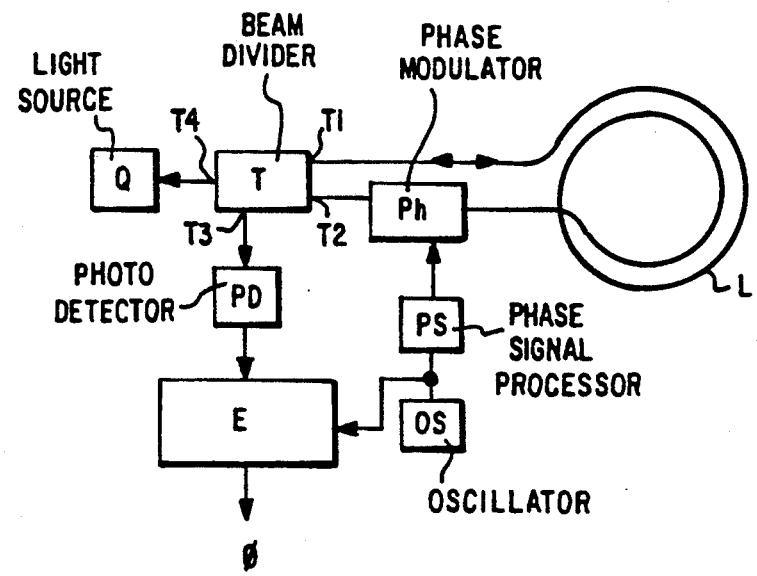
FIG. 1 is a schematic block diagram of a light conductive fiber ring interferometer according to the present invention.

As schematically shown in FIG. 1, a light beam emitted from a light source Q is fed to a beam divider T, through port T4, where the light beam is divided into first and second beams. The divided light beam exiting via ports T1 and T2, travels into both ends of a light path of a light conductive fiber coil L, circulates through fiber coil L in opposite directions and re-enters beam divider T via ports T1 and T2, respectively, where the first and second beams are combined to produce an optical output at port T3.

A phase modulator Ph, disposed in the light path of coil L, is actuated by an electrical oscillator OS and a phase signal processor PS, in such a manner that a periodic, preferably sinusoidal, optical phase modulation at a frequency f results. Thus, the light signals circulating in the light path of coil L are phase modulated.

For further processing, the optical output signal of the optical fiber at port T3 can be converted in a known manner into an electrical signal via photodetector PD. This electrical analog output signal a is then, digitally processed via an evaluation device E.

Figure 2:
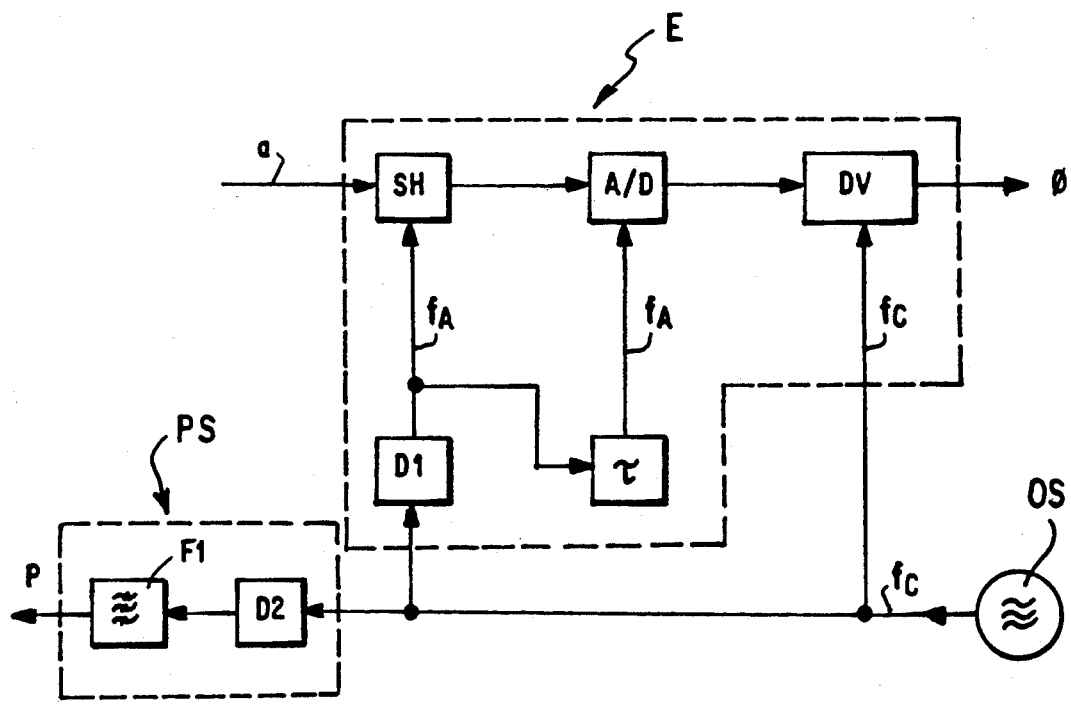
FIG. 2 is a block circuit diagram illustrating in greater detail the digital signal processing of the output signal of the fiber ring interferometer shown in FIG. 1.

As indicated in the block circuit diagram of FIG. 2, the analog output signal a of the ring interferometer is fed to a sample and hold member SH before it is digitalized in an analog/digital converter A/D and then evaluated in a data processing device DV in order to determine the Sagnac phase $\phi$. According to the invention, the sample and hold member SH and the analog/digital converter A/D each are operated at a sampling frequency $f_A$ which lies considerably below the phase modulation frequency f of the output signal a of the fiber ring interferometer. This sampling makes the signal processing in analog/digital converter A/D and in data processing device DV (e.g., a microprocessor) less expensive. However, the sampling frequency $f_A$ must be selected so that the spectral lines ($f_n = n \cdot f$) of the output signal of the fiber ring interferometer required for a determination of the Sagnac phase are covered by the sampling at frequency $f_A$ in the sample and hold member SH.

This requirement is met by a sampling frequency $f_A$ which fulfills the following two conditions:

$$f_A = (f \pm f_\Delta)/m \quad (1)$$

$$f_A = \frac{l}{m} f_\Delta \quad (2)$$

where m and l are integers, and $f_\Delta$ is a whole number component i.e., subharmonic, of the phase modulation frequency f. For example, the integer l is a power of two or an odd number, or the factor $1/2^i$ (where $m = 2^i$ and $i = 1, 2, \ldots$, under the condition that $l/2^i > 1$) is an odd number.

For frequency $f_\Delta$, Equations (1) and (2) yield $$f_\Delta = \frac{f}{l \mp 1} \quad (3)$$

For the $n^{th}$ spectral line $f_n$, which is the n-fold multiple of the phase modulation frequency f ($f_n = n \cdot f$), the following applies:

$$n \cdot f_\Delta = \frac{nf}{l \mp 1} = \frac{f_n}{l \mp 1} \quad (4)$$

This shows that the sampling at frequency $f_A$ according to Equations (1) and (2) is able to convert the spectral lines into a frequency raster which lies in a lower frequency range that is more favorable for digital signal processing.

Using Equations (1) and (2), it follows that $$f_A = \frac{1}{m} \frac{l}{l \mp 1} f \quad (5)$$

and finally, from Equation (3) it follows that $$f = (l \mp 1) f_\Delta \quad (6)$$

From equations (5) and (6) it can be shown that sampling frequency $f_A$ for sample and hold member SH and for analog/digital converter A/D, as well as phase modulation frequency f may be derived by frequency division from a common reference frequency, $$f_c = m_1 \cdot l (l \mp 1) f_\Delta \quad (7)$$

where $m_1$ is an integer. Thus, the following applies:

$$f_A = \frac{f_c}{m_1 (l \mp 1) m} \quad (8)$$

$$f = \frac{f_c}{m_1 \cdot l} \quad (9)$$

As can be seen in FIG. 2, the sampling frequency $f_A$ is derived from the reference frequency $f_c$ generated by the oscillator OS via a first divider D1 having a dividing factor of $1/[m_1 \cdot (l \mp 1) \cdot m]$ as set forth in Equation (8). In addition, the phase modulation frequency f is generated via a second divider D2 having the dividing factor $1/(m_1 \cdot l)$ of Equation (9). An actuation signal $$p = \sin 2\pi f t \quad (10)$$

is then available at the output of a smoothing filter F1 which is connected to the output of second divider D2 to produce the desired signal p for the phase modulator Ph.

A delay member $\tau$ connected between the output of the first divider D1 and the sampling input of the analog/digital converter A/D compensates for a signal delay in the sample and hold member SH.

The above-mentioned sample and hold member SH is not absolutely necessary. Only for the case in which analog/digital converter A/D is relatively slow, is it necessary to connect its input to a sample and hold member SH which has a short aperture time for the momentary sampled value.

Figure 3:
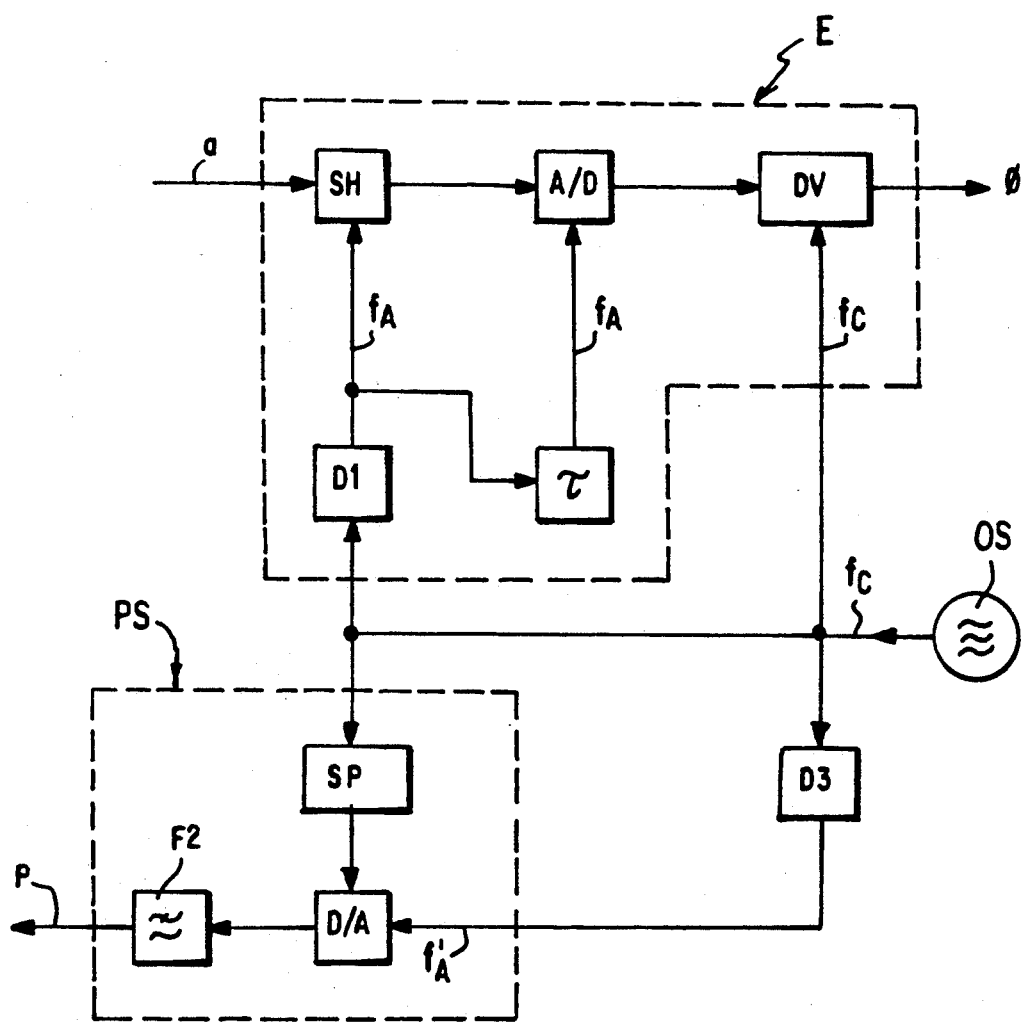
FIG. 3 shows a block circuit diagram similar to that of FIG. 2 provided with a circuit for digitally realizing a phase modulation signal according to the present invention.

The block circuit diagram of FIG. 3 is a modification of the circuit shown in FIG. 2 and the same reference characters designate the elements described above. This embodiment, according to the invention, shows that the actuation signal p according to Equation (10) can also be derived from a digital signal in the form of sin $(2\pi k f)/(m_2 f_A)$ where k and $m_2$ are integers. This digital signal is stored in a memory unit SP which may include, for example, a read-only memory or ROM. As shown in FIG. 3, oscillator OS outputs the reference frequency $f_c$ to memory unit SP which, in turn, outputs the appropriate stored digital signal.

The digital signal from memory unit SP is fed to a digital/analog converter D/A along with a frequency signal $f_A'$ generated by a third divider D3. Accordingly, digital/analog converter D/A is operated at the sampling frequency $f_A'$. This sampling frequency $f_A'$ is greater than the sampling frequency $f_A$ employed in the remainder of the circuit. The analog output signal of digital/analog converter D/A, once it has passed through a smoothing filter F2, has the form defined by Equation (10). Expenditures for smoothing filter F2 remain low if the following condition is met:

$$f_A' = m_2 f_A \qquad (11)$$

(where for example, $m_2 \geq 4$).

It is advisable to employ an oscillator OS whose reference frequency $f_c$ is tunable. Thus it is possible, for example, to compensate for temperature dependent deviations of the phase modulation frequency f.

It will be understood that the above description of the present invention is susceptible to various modifications, changes and adaptations, and the same are intended to be comprehended within the meaning and range of equivalents of the appended claims.

What is claimed is:

1. In a method for determining angular velocities by means of an optical fiber ring interferometer including passing light waves, in opposite directions, through the optical ring interferometer, modulating the passing light waves with a phase modulation frequency f, and combining light waves leaving the optical fiber ring interferometer to produce an output signal, the improvement comprising the steps of:

generating a sampling frequency $f_A$ which satisfies the following equations:

$$f_A = (f \pm f_\Delta)/m$$

$$f_A = \frac{l}{m} f_\Delta$$

wherein the factors m and l are integers and $f_\Delta$ is a subharmonic of the phase modulation frequency f;
converting the output signal via an analog/digital converter into a digital signal at the sampling frequency $f_A$; and
evaluating the resultant said digital signal to determine the angular velocity.

2. A method as defined in claim 1, further comprising the step of sampling the output signal in a sample and hold member at the frequency $f_A$ before said step of converting the output signal into a digital signal.

3. A method as defined in claim 2, wherein said step of generating includes deriving the sampling frequency $f_A$ and the phase modulation frequency f from a reference frequency $f_c$ according to the following equation:

$$f_c = m_1 \cdot l(l \mp 1) f_\Delta$$

where $m_1$ is an integer.

4. A method as defined in claim 3, further comprising the step of delaying the derived sampling frequency $f_A$ used during said step of converting the output signal into a digital signal to compensate for delay during said step o sampling in a sampling and hold member.

5. A method as defined in claim 1, wherein said step of generating includes deriving the sampling frequency $f_A$ and the phase modulation frequency f from a reference frequency $f_c$ according to the following equation:

$$f_c = m_1 \cdot l(l \mp 1) f_\Delta$$

where $m_1$ is an integer.

6. A method as defined in claim 5, further comprising the step of tuning the reference frequency $f_c$ to compensate for temperature dependent deviations of the desired phase modulation frequency.

7. A method as defined in claim 1, wherein the factor l is an odd number.

8. A method as defined in claim 1, wherein the factor m equals $2^i$ and $1/2^i$ (where i = 1, 2, ...) is an odd number.

9. A method as defined in claim 8, wherein the factor $1/2^i$ is greater than 1.

10. A method as defined in claim 1, wherein the factor l is a power of two.

11. A method as defined in claim 1, further comprising the step of deriving an analog signal sin $2\pi f t$ from a digitalized signal in the form of sin $[(2\pi k f)/(m_2 f_A)]$ (where k, $m_2$ are integers) in order to actuate the step of phase modulating the light waves passing through the fiber ring interferometer.

12. A method as defined in claim 11, wherein the deriving step includes reading the digitalized signal from a memory and subjecting the stored digitalized signal to digital/analog conversion at a sampling frequency $f_A'$, where $f_A' = m_2 \cdot f_A$.

13. In a circuit arrangement for determining angular velocities by means of an optical fiber ring interferometer including a light source emitting a light beam; means for dividing the emitted light beam into two beams and passing the two beams of light waves, in opposite directions, through an optical fiber ring of the interferometer; phase modulation means for modulating the passing light waves at a phase modulation frequency f; and means for combining light waves leaving the optical fiber ring to produce an output signal, the improvement comprising:

means for generating a sampling frequency $f_A$ so that the following conditions are met:

$$f_A = (f \pm f_\Delta)/m$$

$$f_A = \frac{l}{m} f_\Delta$$

where the factors m and l are integers and $f_\Delta$ is a subharmonic of the phase modulation frequency f;
analog/digital conversion means for converting said output signal into a digital signal at the sampling frequency $f_A$; and
means for evaluating said digital signal to determine the angular velocity.

14. A circuit arrangement as defined in claim 13, further comprising a sample and hold means, connected between said means for combining and an input of said analog/digital conversion means, for sampling said output signal at said frequency $f_A$ and outputting a sampled output signal to said analog/digital conversion means where it is converted into said digital signal.

15. A circuit arrangement as defined in claim 14, further comprising delay means, connected between said generating means and said analog/digital coversion means, for delaying the sampling frequency $f_A$ fed to said analog/digital conversion means.

* * * * *